United States Patent
Nacarato

[15] 3,679,255
[45] July 25, 1972

[54] MOUNTING MEANS FOR WINDSHIELD LIGHT FILTER

[72] Inventor: Ralph A. Nacarato, 528 Murray Hill Drive, Youngstown, Ohio 44505

[22] Filed: Oct. 15, 1970

[21] Appl. No.: 80,923

[52] U.S. Cl. .................................................. 296/97 C
[51] Int. Cl. ................................................... B60j 3/02
[58] Field of Search ........................... 296/97 R, 97 C, 97 K

[56] References Cited

UNITED STATES PATENTS

| 2,261,881 | 11/1941 | Horstmann | 296/97 C |
| 2,701,612 | 2/1955 | Steidl | 296/97 C |
| 2,020,585 | 11/1935 | Stansberry | 296/97 C |
| 2,212,007 | 8/1940 | Buchanan | 296/97 C |
| 3,261,638 | 7/1966 | Weingarten | 296/97 R |

Primary Examiner—Benjamin Hersh
Assistant Examiner—John A. Pekar
Attorney—Webster B. Harpman

[57] ABSTRACT

A mounting for a windshield light filter having a transparent tinted filter member attachable to a sun visor in an automobile whereby the filter member may be positioned between the driver of the automobile and a selected portion of the windshield thereof or alternately moved to a position where it is horizontally disposed beneath the top of the automobile.

3 Claims, 3 Drawing Figures

PATENTED JUL 25 1972
3,679,255
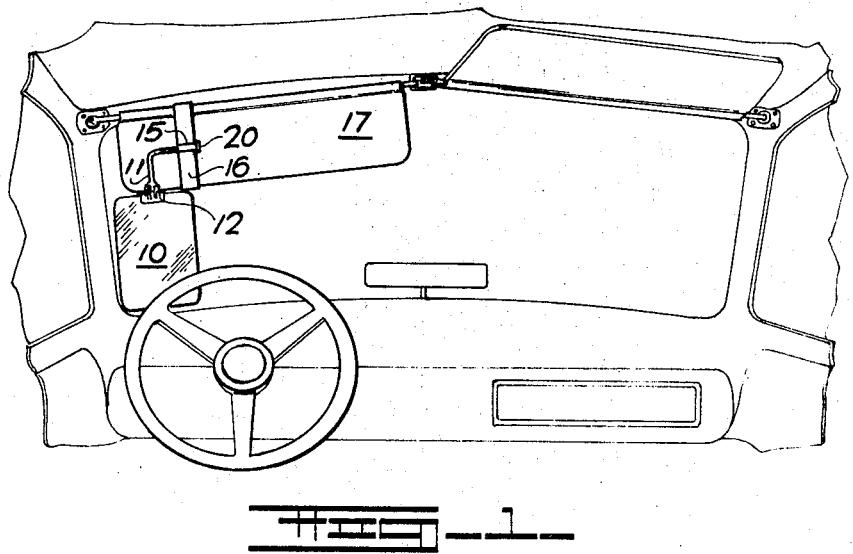
FIG. 1
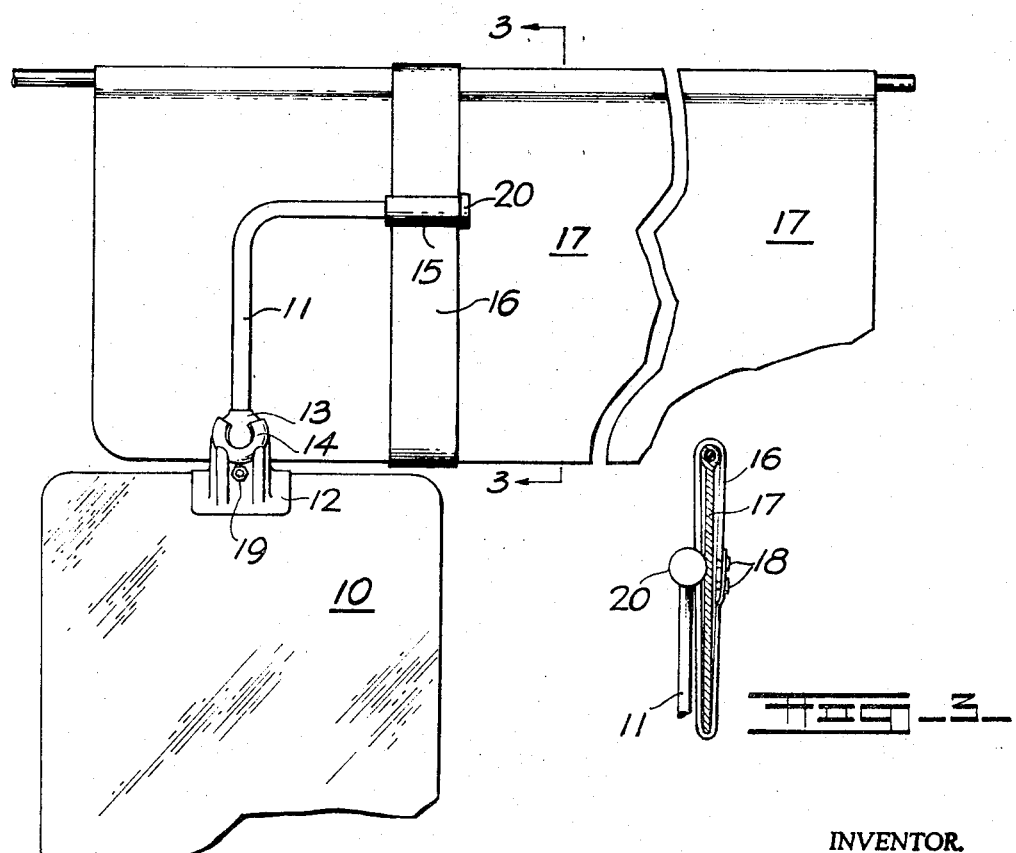
FIG. 2
FIG. 3
INVENTOR.
Ralph A. Nacarato.
BY
W. B. Hangman
ATTORNEY.

MOUNTING MEANS FOR WINDSHIELD LIGHT FILTER

BACKGROUND OF THE INVENTION

1. Field of the Invention

This invention relates to attachment means for light filters for automobile sun visors of the type employed to provide a partial light screen between the driver and the headlights of approaching automobiles.

2. Description of the Prior Art

Prior structures of this type usually employ a light filtering member of tinted transparent plastic material with various mounting means usually of a hinge type adjustably securing the filter member to the automobile windshield frame. Prior structures have generally proposed attachment to the windshield frame so as to position the filter member with respect to the driver and his line of vision therethrough (see U.S. Pat. Nos. 2,020,585; 2,106,889; 2,825,601 and 3,372,953). This invention provides a universal mounting enabling the filter member to be removably positioned on the sun visor of the automobile.

SUMMARY OF THE INVENTION

A mounting for a light filter for automobile windshields comprising a structure including a light filter screen formed of transparent tinted plastic material that is semi-rigid and of optical quality and having a mounting bracket thereon incorporating a tensioned ball and socket construction with an L shaped arm extending from the ball to a tubular member on an adjustable strap adapted to encircle the sun visor of the automobile.

DESCRIPTION OF THE DRAWINGS

FIG. 1 is a perspective view with parts broken away showing a portion of the interior of an automobile illustrating the light filter in position against the windshield thereof.

FIG. 2 is an enlarged plan view with parts broken away showing the mounting for the light filter.

FIG. 3 is a vertical section on line 3—3 of FIG. 2.

DESCRIPTION OF THE PREFERRED EMBODIMENT

In its simplest form the mounting for a light filter for automobile windshields is comprised of a section of transparent tinted plastic material 10 having an L shaped mounting arm 11 secured thereto by a mounting bracket 12 extending s sufficient distance along an edge of the section of transparent tinted plastic material 10 to suitably hold the same in desired position.

The L shaped mounting arm 11 has a ball 13 thereon which is engaged in a tensioned socket 14 in the mounting bracket 12. The mounting bracket 12 extends above the top surface of the section of transparent tinted plastic material 10 as best seen in FIG. 2 of the drawings.

By referring thereto it will be observed that the L shaped arm 11 having the ball 13 on one end has its opposite end rotatably engaged in a tubular member 15 carried on a flexible adjustable strap 16 which is positioned around a sun visor 17 of the automobile. The strap 16 is provided with fasteners 18 by which the strap 16 is held in position on the sun visor 17. The section of transparent tinted plastic material 10 is thus movable in relatively great degree with respect to the sun visor 16 and the windshield of the automobile.

Still referring to FIG. 2 it will be seen that the tensioned socket 14 is so formed that the ball receiving area may be tensioned by a nut and bolt 19. The ball 13 on the arm 11 caged in the socket 14 in the mounting bracket 12 frictionally engages the same so that it can be frictionally controlled with respect to its position in the socket 14 by the degree of tightness to which bolt 19 is tensioned.

By referring again to FIGS. 1 and 2 it will be seen that the arrangement of the mounting arm 11 with the ball 13 and a flange 20 on its opposite end is such that the section of transparent tinted plastic material 10 can be removed from the position adjacent one end of the windshield to alternate positions longitudinally of the sun visor 17 and it will occur to those skilled in the art that the arrangement is such that the section of transparent tinted plastic material 10 can be positioned adjacent the top of the automobile where it is out of the way with respect to both the windshield 13 and the sun visor 17. By moving the sun visor 17 to a position alongside the side window of the automobile the light filter 10 may be used in that position.

It will thus be seen that a mounting for a light filter for automobile windshields has been disclosed which has the unique ability of being positioned in adjustable relation to the windshield and oncoming traffic viewed therethrough as well as movable to a position against the top of the automobile in the event the light filter is not needed.

Although but one embodiment of the present invention has been illustrated and described it will be apparent to those skilled in the art that various changes and modifications may be made therein without departing from the spirit of the invention.

I claim:

1. A light filter and mounting structure for automobile sun visors comprising a section of transparent tinted material, a mounting bracket on said section of transparent tinted material, a socket formed in said mounting bracket and an L shaped arm having a ball on one end movably secured in said socket, an adjustable flexible strap positioned around said sun visor, a tubular bracket on said strap, the other end of said L shaped arm movably positioned in said tubular bracket so as to adjustably support said light filter.

2. The light filter and mounting of claim 1 wherein an annular flange is formed on the end of said L shaped arm that is engaged in said tubular bracket to limit endwise movement of said arm.

3. The light filter and mounting of claim 1 wherein cooperating fasteners are located on said strap and are adjustable to change the effective length of said strap and the location of said tubular bracket relative to said sun visor.

* * * * *